(12) United States Patent
Chang et al.

(10) Patent No.: US 12,540,905 B2
(45) Date of Patent: Feb. 3, 2026

(54) SYSTEM AND METHOD FOR OPTICAL MAPPING OF SEMICONDUCTOR WAFERS AT CRYOGENIC TEMPERATURES UNDER TRANSMISSION GEOMETRY

(71) Applicant: EPIR, Inc., Bolingbrook, IL (US)

(72) Inventors: Issac L. Chang, Naperville, IL (US); Sushant Sonde, Darien, IL (US); Silviu Velicu, Willowbrook, IL (US); Yong Chang, Naperville, IL (US)

(73) Assignee: EPIR, INC., Bolingbrook, IL (US)

( * ) Notice: Subject to any disclaimer, the term of this patent is extended or adjusted under 35 U.S.C. 154(b) by 239 days.

(21) Appl. No.: 18/143,257

(22) Filed: May 4, 2023

(65) Prior Publication Data

US 2024/0201105 A1    Jun. 20, 2024

Related U.S. Application Data

(60) Provisional application No. 63/433,471, filed on Dec. 18, 2022.

(51) Int. Cl.
*G01N 21/95* (2006.01)
*G01N 1/42* (2006.01)

(52) U.S. Cl.
CPC .......... *G01N 21/9505* (2013.01); *G01N 1/42* (2013.01); *G01N 2201/06113* (2013.01); *G01N 2201/0636* (2013.01); *G01N 2201/103* (2013.01)

(58) Field of Classification Search
CPC ................ G01N 21/9505; G01N 1/42; G01N 2201/06113; G01N 2201/0636; G01N 2201/103; G01N 21/9501
See application file for complete search history.

(56) References Cited

U.S. PATENT DOCUMENTS

| | | | |
|---|---|---|---|
| 6,207,959 B1* | 3/2001 | Satoh | H01J 37/3171 250/442.11 |
| 2003/0164182 A1* | 9/2003 | Jacobs | A61B 90/70 134/95.1 |
| 2005/0009224 A1* | 1/2005 | Yang | H01G 9/2027 438/57 |
| 2011/0261363 A1* | 10/2011 | Picque | G01J 3/453 356/451 |
| 2019/0178720 A1* | 6/2019 | Padilla | H04N 23/23 |

* cited by examiner

*Primary Examiner* — Kiho Kim
(74) *Attorney, Agent, or Firm* — Erickson Law Group, PC

(57) ABSTRACT

A method of performing scans on a semiconductor wafer is provided wherein the scanning motion is actuated through a system including a linear one-dimensional motion of the scan head; and rotational motion of a scanned wafer and an associated wafer holder. The wafer to be scanned is placed in a vacuum cryogenic enclosure, into the walls of which has been set an infrared window such that transmitted and reflected radiation from probing beams is perceptible by detectors outside the cryogenic enclosure. The scanning of the wafer is conducted through infrared transmittance and reflectance measurements of a probe beam focused on a point on the scanned wafer which is pumped by a pulsed laser.

21 Claims, 2 Drawing Sheets

SYSTEM AND METHOD FOR OPTICAL MAPPING OF SEMICONDUCTOR WAFERS AT CRYOGENIC TEMPERATURES UNDER TRANSMISSION GEOMETRY

This application claims the benefit of U.S. Provisional Application 63/433,471 filed Dec. 18, 2022.

STATEMENT REGARDING FEDERALLY SPONSORED RESEARCH OR DEVELOPMENT

This invention was made with government support under US Government contract: DE-SC0020692 awarded by Department of Energy. The government has certain rights in the invention.

BACKGROUND

The present invention is directed toward the mapping and characterization of large-area semiconductor wafer performance parameters utilizing optical transmission measurements under cryogenic temperatures down to 2K.

Absorption measurement is well employed in semiconductor material characterization. The electron bandgap of materials can be directly measured through infrared transmission measurement, which is used to conveniently determine the composition of alloy semiconductors and the cutoff wavelength of those materials for the fabrication of light sensors. The measurement of excess free carrier absorption (FCA) decay behavior in materials enables the obtaining of the excess carrier recombination lifetime, and therefore, the carrier lifetime mapping measurements on wafers can provide a rapid technique to quantify the quality of the semiconductor materials, more specifically to characterize initial material quality and the impact of subsequent processing on those properties.

The present inventors have recognized that to better understand the material physics and better characterize the material performances, temperature-dependent measurements down to cryogenic temperatures are required.

However, the present inventors have recognized that present mapping structures are not available to wafers larger than 3 inches (75 mm) because of their use of cartesian mapping coordinates. In cryogenic environments with larger samples, this structure becomes infeasible, as in such scan regimes an infrared window encompassing the entire sample region must be inset into each wall of the insulating vacuum chamber with sufficient sealing.

The present inventors have recognized that the difficulty of synthesizing windows of sufficient area is thus a limiting factor of the cost efficiency and scalability of current systems. The present inventors have recognized that this problem is further exacerbated by the large mechanical stresses experienced by said windows that increase dramatically with area, thereby necessitating costly increases to the thickness of the windows. Such increases can furthermore severely deteriorate the signal to be analyzed due to bowing distortion caused by the enlarged area of the window material, as well as elevate signal attenuation and distortion modes such as absorption, reflection, and refraction because of the increases in thickness necessary to reduce bowing to acceptable levels.

Furthermore, the present inventors have recognized that increasing the area of the infrared windows increases the radiative energy transfer from the ambient-temperature surroundings into the sample chamber and thus imposes a hard limit on the minimum achievable temperature during scanning.

For these reasons, the present inventors have recognized that the existing cartesian scan structure is inadequate for the aforementioned purposes.

SUMMARY

An exemplary embodiment of the invention provides an apparatus that conducts optical measurements under transmission geometry at cryogenic temperatures down to 2K, with improved scalability of the scanning setup; as it uses only the radial motion of the probe and detector and the rotational motion of the sample and thereby requires only one large degree of freedom in the window elements, a larger range of possible scan sizes is attainable with currently available infrared windows.

By enabling the use of small scan windows occupying only a small portion of the scan area, the described method increases cost-effectiveness as well as reduces mechanical stresses on the window that can induce bowing deformation, enabling the use of significantly thinner infrared windows with greatly reduced signal absorption, attenuation, and reflection, and thus increases in signal intensity and thus scan precision. These increases in mechanical integrity relative to thickness also prevent breakages of the window during practical usage. Furthermore, the increase in reflective surface area in each chamber due to the reduction of window area minimizes radiative heat exchange with the environment, enabling a lower and more stable achievable temperature during the scanning process.

The exemplary method of the invention provides a method of contactless, non-destructive, contamination-free, 2-dimensional mapping of the cutoff wavelength (or bandgap) and the minority carrier lifetime, which is measured through photo-excited excess free carrier absorption decay method, in semiconductor thin film materials and wafers, including typical semiconductor wafers such as Si, Ge, GaAs, and GaSb as well as narrow gap semiconductors such as InSb, type II superlattices (T2SLs) and HgCdTe, at variable temperatures from room temperature down to 2K, utilizing a three-chamber arrangement in which the external chamber and cold chamber are held at ultra-high vacuum and the innermost (sample) chamber is held at cryogenic temperature to cool wafer or thin film samples through gaseous thermal transfer media to cryogenic temperatures down to 1.9 K under pumping. To achieve full-range wafer mapping, the exemplary apparatus can include the measurement and sensing components for transmitted and reflected light, including infrared probing beam sources, such as long-wavelength infrared lasers, fast HgCdTe detectors, or detector liner or 2-dimensional arrays mounted in liquid nitrogen dewars or thermoelectric (TE)-cooled detector housings, excitation lasers with a wavelength shorter than the bandgap of the sample to be measured, a broadband infrared source with focusing mirror, light grating with mirror and its other accessories including the motion execution and control components, and a linear LWIR array in a liquid nitrogen Dewar, are positioned outside all three chambers and can be moved through a carriage mounting to create the radial component of the mapping motion domain. The rotation of the sample holder is controlled through a drive gear located inside the sample chamber and creates the angular component of the mapping motion domain.

BRIEF DESCRIPTION OF THE DRAWINGS

A more complete understanding of the present invention may be had by reference to the following detailed description when taken in conjunction with the accompanying drawings wherein.

DETAILED DESCRIPTION

Figure 1:
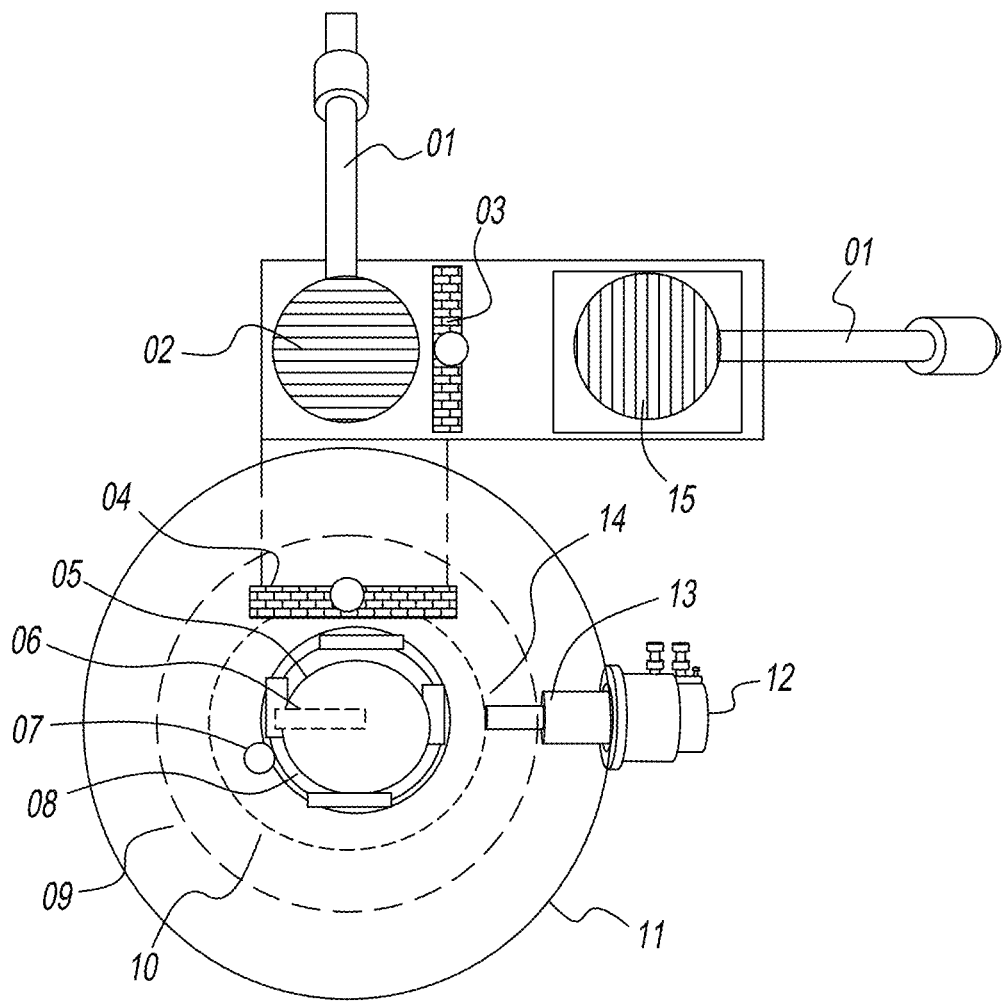
FIG. 1 is a schematic, top view of an exemplary embodiment cryogenic wafer scanner system with loading and transfer/warming chambers and its components.

While this invention is susceptible of embodiment in many different forms, there are shown in the drawings, and described herein in detail, several specific embodiments with the understanding that the present disclosure is to be considered as an exemplification of the principles of the invention and is not intended to limit the invention to the embodiments illustrated.

It will be understood that like or analogous elements and/or components, referred to herein, are identified throughout the drawing by like reference characters. In addition, it will be understood that the drawings are merely representations of the invention, and some of the components may have been distorted from actual scale for purposes of pictorial clarity.

FIG. 1 illustrates a schematic of an exemplary embodiment cryogenic wafer scanner system and its components. In this embodiment, multiple cryogenic chambers are used to maintain the stability of the scan environment temperature during the scanning process, especially during cryogenic scan conditions.

Referring to FIG. 1, a sample to be scanned 05 is placed within an innermost chamber 10, which is attached to a second stage of a cryostat 12 at an attachment point 14.

Referring to FIG. 1, inserted gas inside chamber 10 is helium, which is used to cool the sample.

Referring to FIG. 1, the scan chamber 10 is nested inside intermediate chamber 09, which is enclosed by the outer chamber 11.

Referring to FIG. 1, intermediate chamber 09 is held at ultra-high vacuum (UHV) and is connected to the first stage of a cryostat at an attachment point 13. The intermediate chamber 09 also serves as a cold shield to limit radiation heat loss as well as stops small amounts of helium leakage from the helium filled innermost chamber 10 (sample chamber) to further reduce heat exchange between outer chamber 11 and intermediate chamber 09. Furthermore, the intermediate chamber 9 greatly reduces radiative heat transfer during the scanning process.

Referring to FIG. 1, the outermost chamber 11 is held at UHV and ambient temperature, and it serves to isolate the outside environment from the cryogenic chambers, so the scan at ambient moisture does not contact cryogenic components and the condensation of moisture and corresponding deterioration in optical transparency of windows and other components is averted. The integration of chamber 11 further reduces heat transfer due to radiation.

During the scanning process of the embodiment displayed in FIG. 1, a wafer 05, as a sample to be scanned, is inserted into the system through a loading chamber 15 whose dimensions do not substantially exceed those of the wafer. The loading chamber is initially held at ambient pressure but is depressurized by an attached turbopump while a magnetic transfer rod 01 transports the wafer and attached holder through a gate valve 03. In this embodiment, the multiple steps of the transfer process ensure that the integrity of the vacuum is maintained during each scan. Subsequently, another magnetic transfer rod transports the wafer and associated holder through a sequence of gate valves 04 and into the sample chamber, wherein the sample holder 08 is engaged with a gear drive mechanism 07 that enables rotation of the sample.

The execution of the scan in the embodiment displayed in FIG. 1 is realized through the movement of the exciter-sensor assembly along a one-dimensional gantry, driven by stepper motors through a timing belt and pulley or through a lead screw, as well as the rotation of the sample as controlled by the gear mechanism. The rotation within the sample chamber enables the allocation of only a very thin slit of area to the window 06.

Referring to FIG. 1, scan mobilization is achieved through magnetically coupled rotary feedthroughs that enable the precise transmission of force from a stepper motor to the sample through a gear mechanism 07. The cooling of both cryogenic chambers (09 and 10) is executed by a single cryostat with attachments points 13, 14 at both stages, minimizing the number of dedicated cooling systems needed.

Figure 2:
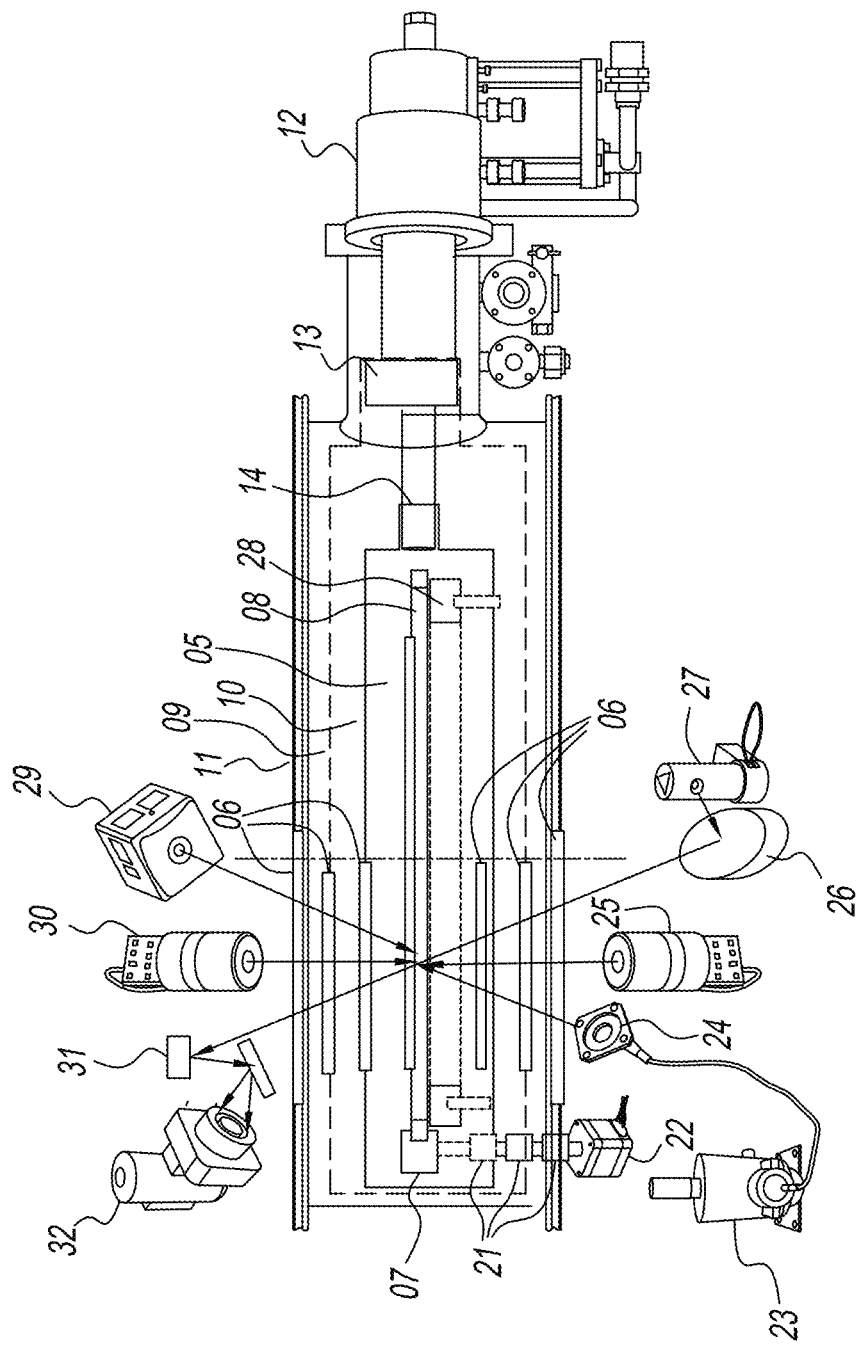
FIG. 2 is a schematic, cross-section view of an exemplary scan mobilization and probing structure in the main chamber of the system of FIG. 1.

FIG. 2 demonstrates a cross section view of the system of FIG. 1, particularly an exemplary scan mobilization and probing structure.

Referring to FIG. 2, the outer chamber 11 and the intermediate chamber 09 are present in order to eliminate atmospheric-composition interference (such as moisture) and greatly reduce thermal interference with the scan process as well as stabilize scan conditions. The innermost (sample) chamber 10 is held at deep cryogenic temperatures and enables the cooling of the sample itself by thermal transfer through the transfer medium gas (helium). The innermost chamber 10 is in direct thermal contact with the second stage of the cryostat 12 at the attachment point 14, and the intermediate chamber is in direct thermal contact with the first stage of the cryostat 12 at attachment point 13.

The system as shown in FIG. 2 enables the use of analysis across multiple frequencies. Pumping lasers 25 and 30 excite free carriers in the wafer that can interact with a long wave infrared (LWIR} probe beam from laser housing 29, and the probe beam's intensity is collected by an LWIR collector 24 and directed through fiber optics to a fast LWIR detector 23. The integration of two distinct pumping lasers enables analysis of free carrier lifetimes across multiple colors of infrared signals. A broad-band infrared source 27 and an off-axis parabolic mirror 26 enable the selection of further probe frequencies, and the intensity of the beams thereof is wavelength-filtered by a diffraction grating 31 and subsequently measured by an LWIR detector array 32. All probe and excitation optic beams are delivered and collected through the infrared windows 06.

Referring to FIG. 2, the actuation of the angular motion of the scanning process is executed though the drive gear 07, which is linked to an external stepper motor 22 through magnetically coupled rotary feedthroughs 21. This drive gear engages an outer gear disk of the sample holder 08, which is toothed to match the drive gear, producing precisely-controllable rotational motion. The sample wafer 05 and associated holder 08 rotate on an angular-contact ball bearing 28 inset into the flooring of the scan chamber.

During the scanning process of the embodiment depicted in FIG. 2, triangular mesh-based analysis and display, as opposed to square-region based techniques, are implemented on attached control systems to dynamically adjust the turn rate of the sample based on received data, enabling time-efficiency and detailed mapping of regions of anomalous parameters.

From the foregoing it will be observed that numerous variations and modifications may be effected without departing from the spirit and scope of the invention. It is to be understood that no limitation with respect to the specific apparatus illustrated herein is intended or should be inferred.

The invention claimed is:

1. A method of performing scans on a semiconductor wafer, comprising the steps of:
    placing a semiconductor wafer in a vacuum cryogenic enclosure;
    setting into one or more walls of the vacuum cryogenic enclosure an infrared window such that transmitted and reflected radiation from probing beams is perceptible by detectors outside the cryogenic enclosure;
    scanning the semiconductor wafer using a linear one-dimensional motion of a scan head; and
    using a rotational motion of a scanned wafer and an associated wafer holder.

2. The method according to claim 1, wherein the scanning of the wafer is conducted through infrared transmittance and reflectance measurements of a probe beam focused on a point on the scanned wafer which is pumped by a pulsed laser.

3. The method according to claim 2, wherein the transmittance and reflectance measurements are conducted at multiple frequencies using multiple lasers.

4. The method according to claim 3, wherein an off-axis parabolic mirror is utilized to obtain detailed frequency data.

5. The method according to claim 1, wherein the cryogenic enclosure is enclosed within multiple vacuum chambers held at varying temperatures, into the walls of all of which have been set infrared windows, wherein the scanning of the wafer is conducted through infrared transmittance and reflectance measurements of a probe beam focused on a point on the scanned wafer which is pumped by a pulsed laser.

6. The method according to claim 1, wherein the cooling of the wafer is achieved with a heat exchange gas for indirect cooling.

7. The method according to claim 6, wherein the walls of the cryogenic chamber are cooled through a cryostat.

8. The method according to claim 6, wherein the heat exchange gas is further defined in that helium is used for cooling.

9. The method according to claim 1, wherein the process of achieving rotational motion of the scanned wafer is further defined in that a gear mechanism embedded in the wall of the chamber is used to rotate the sample during scanning.

10. The method according to claim 1, wherein multiple wafers are mounted onto the same wafer holder and analyzed during the same scan.

11. The method according to claim 1, wherein a separate loading and extraction chamber is used as an airlock.

12. The method according to claim 1, wherein the positions of the scan head and angle of the scanned wafer at which data is collected are precalculated using algorithms on the computer coordinating the scan.

13. The method according to claim 12, wherein the calculation of the mentioned positions is achieved through the use of photographic means to determine the shape profile of the wafer under scan.

14. The method according to claim 12, wherein adjustments to the positions and angles described therein are made based during scanning based on analysis of prior data extracted during the scan.

15. The method according to claim 14, wherein the analysis of data is conducted through triangular meshes of said data.

16. The method according to claim 14, wherein the display of data is conducted through triangular meshes of said data.

17. A method of performing scans on a semiconductor wafer wherein the scanning motion is actuated through a system comprising of
    a linear one-dimensional motion of the scan head; and
    rotational motion of a scanned wafer and an associated wafer holder, wherein the positions of the scan head and angle of the scanned wafer at which data is collected are precalculated using algorithms on the computer coordinating the scan.

18. The method according to claim 17, wherein the calculation of the mentioned positions is achieved through the use of photographic means to determine the shape profile of the wafer under scan.

19. The method according to claim 17, wherein adjustments to the positions and angles described therein are made based during scanning based on analysis of prior data extracted during the scan.

20. The method according to claim 19, wherein the analysis of data is conducted through triangular meshes of said data.

21. The method according to claim 19, wherein the display of data is conducted through triangular meshes of said data.

* * * * *